(12) United States Patent
Monk et al.

(10) Patent No.: US 7,790,274 B2
(45) Date of Patent: Sep. 7, 2010

(54) LAYERED PANEL STRUCTURE INCLUDING SELF-BONDED THERMOFORMABLE AND NON-THERMOFORMABLE LAYER MATERIALS

(75) Inventors: Russell A. Monk, Salem, OR (US); Lance A. Hicks, Salem, OR (US)

(73) Assignee: High Impact Technology, LLC, Tigard, OR (US)

( * ) Notice: Subject to any disclaimer, the term of this patent is extended or adjusted under 35 U.S.C. 154(b) by 412 days.

(21) Appl. No.: 11/881,907

(22) Filed: Jul. 30, 2007

(65) Prior Publication Data

US 2008/0032102 A1 Feb. 7, 2008

Related U.S. Application Data

(60) Provisional application No. 60/835,313, filed on Aug. 2, 2006.

(51) Int. Cl.
*B32B 7/02* (2006.01)

(52) U.S. Cl. .................. 428/213; 428/218; 428/116; 428/441

(58) Field of Classification Search .................. None
See application file for complete search history.

(56) References Cited

U.S. PATENT DOCUMENTS

| | | | |
|---|---|---|---|
| 3,257,260 A | 6/1966 | Morgan | |
| 3,535,198 A | 10/1970 | Bloom | |
| 3,729,368 A | 4/1973 | Ingham et al. | |
| 3,839,080 A | 10/1974 | Jarema et al. | |
| 4,042,746 A | 8/1977 | Hofer | |
| 4,082,882 A | 4/1978 | Weinstein et al. | |
| 4,130,614 A | 12/1978 | Saidla | |
| 4,500,597 A | 2/1985 | Yazaki et al. | |
| 4,645,710 A | 2/1987 | Baitinger et al. | |
| 4,659,618 A | 4/1987 | Yazaki et al. | |
| 4,764,420 A | 8/1988 | Gluck et al. | |
| 4,818,590 A | 4/1989 | Prince et al. | |
| 4,963,408 A | 10/1990 | Huegli | |
| 5,518,806 A | 5/1996 | Eder et al. | |
| 5,540,963 A | 7/1996 | Wong | |
| 5,589,243 A | 12/1996 | Day | |
| 5,695,870 A | 12/1997 | Kelch et al. | |
| 6,006,480 A | 12/1999 | Rook | |
| 6,044,604 A * | 4/2000 | Clayton et al. ............. 52/309.9 |

(Continued)

FOREIGN PATENT DOCUMENTS

CA 2136773 5/1995

(Continued)

*Primary Examiner*—Ling Xu
(74) *Attorney, Agent, or Firm*—Jon M. Dickinson, PC; Robert D. Varitz, PC

(57) ABSTRACT

A layered panel structure featuring a first layer formed of non-thermoformable material, having opposite faces, a thickness T as measured between its opposite faces, and an effective layer density d, and a second layer formed of thermoformable material having opposite faces, with one face in the second layer being thermally bonded to one face in the first layer, and with the second layer having a thickness t, as measured between its opposite faces which is smaller than T, and an effective layer density D which is greater than d. The thermal bond between the layers is formed, during thermoforming of the panel structure, by a melt and flow of resin contained in the thermoformable layer material.

2 Claims, 1 Drawing Sheet

U.S. PATENT DOCUMENTS

| | | |
|---|---|---|
| 6,537,413 B1 | 3/2003 | Hochet et al. |
| 2003/0173014 A1 | 9/2003 | Wardle et al. |
| 2004/0001946 A1 | 1/2004 | Ma et al. |
| 2004/0028958 A1 | 2/2004 | Assink et al. |
| 2004/0101674 A1 | 5/2004 | Ross |
| 2006/0019099 A1 | 1/2006 | Wang et al. |
| 2006/0099383 A1 | 5/2006 | Connelly et al. |

FOREIGN PATENT DOCUMENTS

| | | |
|---|---|---|
| FR | 2 872 085 | 12/2005 |
| GB | 2378919 | 2/2003 |
| WO | WO 92/05950 | 4/1992 |

* cited by examiner

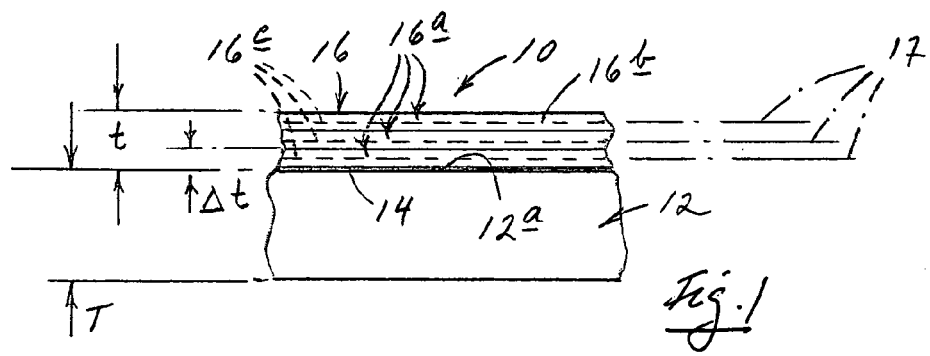
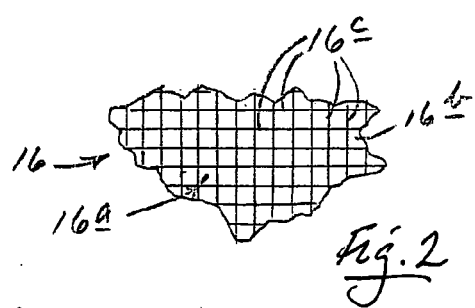
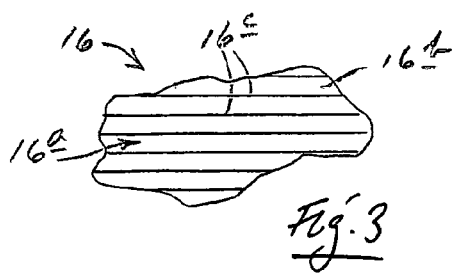
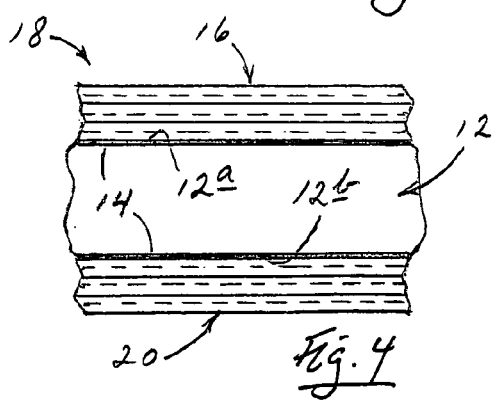
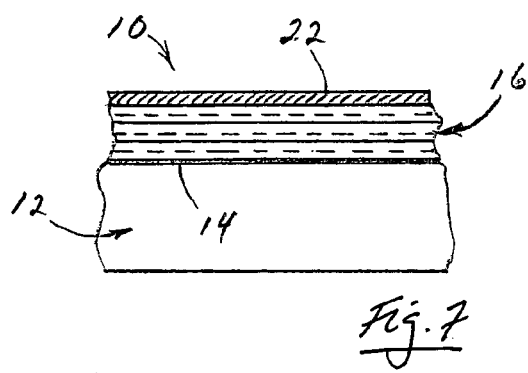
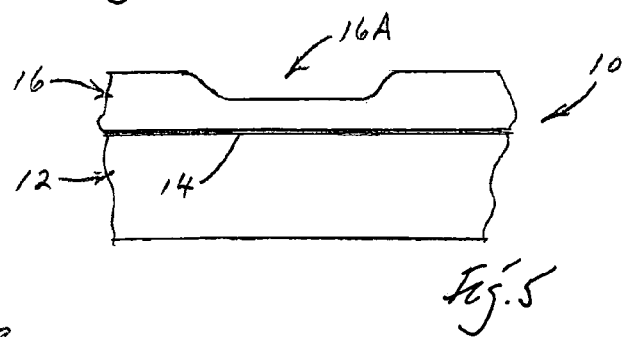
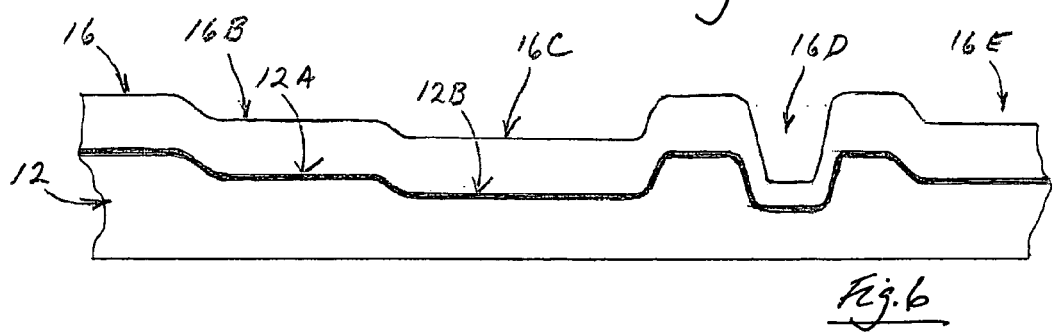

LAYERED PANEL STRUCTURE INCLUDING SELF-BONDED THERMOFORMABLE AND NON-THERMOFORMABLE LAYER MATERIALS

CROSS REFERENCE TO RELATED APPLICATION

This application claims filing date priority to currently co-pending U.S. Provisional Patent Application Ser. No. 60/835,313, filed Aug. 2, 2006 for "Thermoform Layered Structure and Method". The entire disclosure content of that prior-filed provisional application is hereby incorporated herein by reference.

BACKGROUND AND SUMMARY OF THE INVENTION

The present invention relates to a thermo-compression-formed, layered panel structure, and in particular, to such a structure which features a special assembly of both thermoformable and non-thermoformable layer materials self-bondedly joined through what is referred to herein as being a differentiated-material, transition-discontinuity-style, thermally bonded interface, or thermal bond (also called a thermal-compression mechanical bond).

According to this invention, a generally planar, layered panel structure is created which, while, as just mentioned, being generally planar in nature, may have certain topographical surface features that may, at least partially, be compression-thermoformed during assembly of the layer materials which make up the panel structure. The panel structure produced by practice of the invention features a relatively low-density, low-cost, non-thermoformable, principal, generally planar body having opposite faces, to at least one of which faces is thermally compressively bonded to a face in a higher-density, typically-higher-cost, much thinner, fibre-strand-reinforced, thermoformable plastic skin. The body, as measured transversely between its opposite faces (its transfacial thickness), is thicker than the skin as also so measured.

The thermal compression, or thermal compressive, bond existing between these thermoformable and non-thermoformable materials in the panel structure of the invention is referred to variously herein as a self-bond to reflect the fact that, preferably, no additional bonding adhesive is employed. Rather molten plastic material from the thermoformable material per se flows to create the uniting bond between the materials, and a consequence of this structural bonding arrangement is that a finished panel structure performs throughout with just the two desired structural characteristics of only the selected thermoformable and non-thermoformable materials. This has proven, in many application settings, to be a functionally desirable characteristic of the structure of the invention, in that the inter-material, transition bond region per se does not exhibit the otherwise expectable, and perhaps somewhat unpredictable, load-managing behavior of a foreign bonding substance.

This layered assembly, i.e., the panel structure of the present invention, possesses useful overall dimensional bulk (i.e., mainly thickness) which is contributed chiefly by the transfacial thickness of the lower-density body (layer), along with elevated load-bearing strength which is furnished principally by the appreciably higher-density (to be discussed later herein), significantly thinner, strand-reinforced skin (layer). This skin, in addition to offering elevated load-bearing strength, as just mentioned, also affords a high degree of abrasion resistance.

These two different-thermal-characteristic materials may be surface-joined in different organizational ways in an overall panel structure made in accordance with the present invention. Two such surface-joined ways are specifically illustrated herein, including one wherein a finished panel structure is formed with just one-each layer of each of these two materials, and another wherein there is, in a finished panel structure, a central, or core, layer formed of the non-thermoformable material, united with a pair of opposite-side-cladding skin layers formed of the thermoformable material.

The self-bond union of these two materials, produced via a thermally compressively bonded interface described herein, as mentioned above, as being a differentiated-material, transition-discontinuity-style interface, produces a composite structural panel assembly which exhibits (a) the strength that one would typically and intuitively associate with a unitary, homogeneous structure having the thickness and bulk of the principal, non-thermoformable body material, and (b) the light-weightness that one would typically and intuitively associate with a unitary, homogeneous structure having the thinness and low, apparent bulk of the thermoformable skin material. These "intuitive" associations, of course, would most probably come about, at least in part, because of a lack of an initial understanding of the appreciably different layer-density and internal-strength characteristics that are correctly associated with the two different materials that have been chosen for use in the panel structure of the invention.

Additionally, thermoformability of the skin, and thermal bonding of the skin to the body, uniquely allow for the fabrication, in several different ways, of a structural panel having, if desired, a complex surface topography (a) dictated by either or both of (1) pre-shaping of the bonding face of the non-thermoformable body, and/or (2) modest thermal-deformation-compression of the thermoformable skin material, and/or (3) a combination of these two approaches. Where body-material pre-shaping is employed, such pre-shaping telegraphs easily into the final panel configuration of the skin because of the skin's naturally offered thermo-configurational-deformability that is enabled and invoked during thermal-compression bonding of the body and the skin.

Many applications exist for the structural panel of this invention, including within-building wall and door applications, such as garage-door and hurricane-door- and window-panel applications, truck and trailed bed applications, vehicle door-panel applications, boating-structure applications, and many others.

These and other features which are offered by the layered, composite panel structure of the present invention will become more fully apparent as the description of the invention which shortly follows this text, is read in conjunction with the accompanying drawings.

DESCRIPTIONS OF THE DRAWINGS

FIG. 1 is a fragmentary, schematic, cross-sectional view of one embodiment of a panel structure of the present invention which includes a principal body layer made of low-density, non-thermoformable material, to one face in which there is thermally, compressively bonded a fibre-strand-reinforced, higher-density, thermoformable plastic skin layer.

FIG. 2 is a larger-scale, fragmentary, schematic plan illustration of an arrangement of reinforcing fibres included within the skin layer mentioned in FIG. 1, which fibres are deployed in a non-woven, substantially orthogonal pattern with respect to one another.

FIG. 3 is similar to FIG. 2, except that this figure illustrates reinforcing fibres which are unidirectional and substantially parallel to one another in the mentioned skin layer.

FIG. 4 is similar to FIG. 1, except that it illustrates a modified form of panel structure made in accordance with the present invention wherein the generally planar principal body layer has thermally and compressively bonded to each of its two, opposite, broad, generally planar faces a skin layer of the type mentioned in relation to FIG. 1.

FIG. 5 is a fragmentary illustration, similar to a portion of FIG. 1, showing a surface topographical feature which has been created in a region of the illustrated surfacing skin layer by deformation-compression of the skin-layer material during thermal-bonding of the skin layer to the principal body layer.

FIG. 6 is somewhat similar to FIG. 5, except that FIG. 6 shows surface topographical features that have resulted from pre-surface shaping of one of the faces of the illustrated non-thermoformable principal body layer, which shaping telegraphs through to the overall surface of the panel structure through the thermally bonded, thermoformable surfacing skin layer. Such telegraphing takes place during bonding of the skin layer to the principal body layer. FIG. 6 also illustrates a surface topographical feature which has been created in the manner of the topographic feature pictured in FIG. 5.

FIG. 7 illustrates another modified form of the invention in which, on the outer surface of the illustrated skin layer, an auxiliary surfacing material, such as a decorative patterning material, has been attached to the skin layer by thermal-bonding.

DETAILED DESCRIPTION OF THE INVENTION

Turning attention now to the drawings, and referring first of all to FIGS. 1-3, inclusive, indicated generally at 10 in FIG. 1 is a fragmentary, schematic cross-sectional view of a generally planar, layered panel structure made in accordance with a preferred embodiment of the present invention. Structure 10 includes a principal body layer, or body layer portion, 12 which has a thickness T herein, also referred to as a transfacial thickness, of about ¾-inches, and which formed of a suitable low-density, light-weight, relatively low-cost, non-thermoformable material, such as balsa wood. Such wood has a density d typically of about 7-lbs/ft$^3$.

Other satisfactorily usable principal body materials include PVC foam, urethane foam, honeycomb plastics, honeycomb metals and corrugated wood. The preferred density (d) range for a chosen principal body material herein is about 4-lbs/ft$^3$ to about 30-lbs/ft$^3$.

Thermally compressively bonded to the upper surface 12a of body 12 in FIG. 1, through what is referred to herein as the earlier-mentioned differentiated-material, transition-discontinuity-style bonded interface, which interface is shown by a darkened and thickened line 14 in FIG. 1, is a fibre-strand-reinforced, thermoformable plastic resin skin, or skin layer, 16 (reinforcing strands, or fibres, embedded within thermoformable resin). Preferably, skin 16 is formed as a thermally bonded/integrated plurality of three, stacked, generally planar sub-layers, such as the three sub-layers schematically shown at 16a in FIG. 1, which sub-layers are formed each of individually fibre-strand-reinforced, thermoformable, plastic-resin material in sheet form. Each of these three sub-layer sheets has a transfacial thickness Δt lying in the range of about 0.015- to about 0.020-inches, with the stacked collection of all three of these sub-layers thus having a collective transfacial thickness t lying in the range of about 0.045- to about 0.060-inches. In panel structure 10, each of sub-layer sheets 16a preferably has a thickness of about 0.016-inches, and the overall transfacial thickness of skin layer 16 therefore has a transfacial thickness of about 0.048-inches.

The plastic resin material in skin layer 16, illustrated generally at 16b, is substantially continuous and homogeneous because of the thermoforming procedure which has been used to form panel structure 10. This thermoforming procedure causes a resin melt and flow to occur within layer 16, and this melt and flow create the homogeneity characteristic just described. It should be understood that, while horizontal sub-layer division lines appear in FIG. 1 (and in two other drawing figures herein), these lines have been included just to clarify visually the presences of three sub-layer sheets used in the formation of panel structure 10.

The reinforcing fibre strands in skin layer 16, represented generally by dashed lines 16c, lie (float) essentially in three, spaced, generally parallel planes indicated at 17 in FIG. 1.

Turning attention for a moment to FIGS. 2 and 3, and understanding that each of sub-layers is essentially the same in internal construction, FIG. 2 illustrates, for one of sub-layers 16a, a preferred organization of therein-embedded strands 16c, with these strands being non-woven, and, as just above suggested, "floating" within the sub-layer with generally orthogonal dispositions relative to one another in resin 16b. In FIG. 3, strands 16c in the sub-layers are generally unidirectional and parallel one another.

Not specifically illustrated in the drawings, but understood to be a possible organization within the skin sub-layers, is an organization wherein the reinforcing strands are woven in a mesh form. Also not specifically shown, it will be understood that sub-layers 16a may be stacked so as to have their included reinforcing strands, from a sub-layer to sub-layer point of view, oriented at angles relative to one another. Further, there may be applications wherein it is desirable to use a greater or lesser number of sub-layers than three.

While many different specific skin materials may be used appropriately in the structure of the present invention, preferably the thermoformable resin which is employed in the skin material—a thermoplastic resin—is selected from the group including polypropylene, polyester, polyethylene and the material known as PET, and preferably is chosen to be a polypropylene resin, such as that which is employed in a commercial product sold under the trademark Polystrand® made by a company of that same name, located in Montrose, Calif. This preferred-resin skin material has a density D of about 130-lbs/ft$^3$. The fibre reinforcing strands embedded within the skin-material resin are preferably selected from the group including glass, E-glass, S-glass and carbon fibre, and from this group, are preferably made of S-glass.

Within the skin material per se, it is preferable that the ratio, by weight, of strand material to resin lie in the range of about 60:40 to about 80:20, and a preferred ratio is 70:30. With such a preferred ratio, the density D of the preferred polypropylene skin material is, as was mentioned above, about 130-lbs/ft$^3$. Additionally, it is preferred that an appropriate thermoforming temperature for the chosen resin, i.e., a suitable melt/flow temperature therefor, be about 340° F. This thermoforming temperature is what is associated with preferred polypropylene resin 16b herein.

In accordance with the invention, with the principal body and skin materials 12, 16 chosen, panel structure 10, as shown in FIG. 1, is formed from a layer stack of these two materials by compressively thermally bonding skin 16 to surface 12a in body 12 utilizing the appropriate thermal-bonding temperature associated with the particular resin employed in the skin material. An appropriate bonding application pressure of about 30-psi is employed, and when this is done at the appropriate temperature, interface bond 14 is formed by a melt and flow of the skin-material resin material into engagement with body surface 12a and body 12. Where body 12 is formed of a material such as balsa wood, resin melt from the skin material usually enters the pores within such body material. This interfacial resin melt is what directly forms interface bond 14, and is why this bond is referred to herein as a "self-bond".

What results in this procedure is a panel structure (10) having all of the important lightweightness and strength features set forth earlier herein. Appropriate panel bulk is furnished chiefly by the principal body material included in structure 10, and appropriate rigidity and load-bearing strength are contributed principally by the fibre-reinforced thermally-bonded surfacing skin layer. Interface bond 14, formed as it is by resin material melt and flow coming from the skin material during thermal compressive bonding, contributes to such load-bearing strength.

A modified layer form of the invention is illustrated in FIG. 4. Shown here, and employing substantially the same reference numerals utilized so far herein in FIG. 1, a modified panel structure 18 is formed having a principal body 12 which is thermally joined, in addition to a thermally-bonded skin 16 on body surface 12a, to a companion and like surfacing skin 20 that is similarly thermally bonded to the opposite face 12b in body 12.

One of the interesting features uniquely accommodated by the panel structure of the present invention, because of the thermoformable nature of the surfacing skin material which is employed, is illustrated in several different versions in FIGS. 5 and 6 in the drawings. Specifically, these two drawing figures illustrate the possibility of forming subtle, and even complex, three dimensional surface topography features in the outwardly facing surface of the surfacing skin material layer employed in the structure of the invention.

In FIG. 5 a singular surface depression 16A is illustrated in skin layer 16, this depression, which exists only in layer 16, having been formed principally by deformation-compression of layer 16 during thermal-bonding of the assembled panel-structure materials. Topographic shaping, as is here shown, may be accomplished by the use of an external device, such as a heated platen having the appropriate, complementary surface shape. With cooling after such a procedure, the surface of skin layer 16, as shown in FIG. 5 takes on with permanence the formed depression 16A.

In FIG. 6, pre-shaping in the surface topography of surface 12a in panel body 12 has taken place to create a pair of stepped depressions 12A, 12B. This kind of body-surface shaping may, of course, be performed in any appropriate manner. During thermal-bonding of skin 16 to body 12, the thermoformable nature of the skin allows it, through what is referred to herein as telegraphing, to take on with great precision, the pre-shaped topography formed in the underlying body-layer surface (see depressions 16B, 16C which "follow" depressions 12A, 12B, respectively).

It is of course possible to create even more complicated surface topographies through utilizing a combination of the surface shaping approaches so far discussed, respectively, with respect to in FIGS. 5 and 6. For example, FIG. 6 shows, at 16D, 16E, two other kinds of depression-character surface topography which illustrate a certain quality of obtainable surface topographic complexity.

Finally, FIG. 7 illustrates yet a further modified form of the invention which may be chosen for use in certain applications. This modification includes the thermal-bonding, to the outside surface of a skin layer, such as skin layer 16, of some form of appropriate "other" surfacing material, such as the layer material shown generally at 22 in FIG. 7. This other surfacing material (22) is bonded to skin layer 16 during thermal-bonding of skin layer 16 to principal body layer 12, with the bond which thus develops between the skin layer and the added surfacing material developing through contact of that added material with thermally melted resin coming from the skin layer resin.

Thus, production of a special composite panel structure has been shown and described herein in both preferred and modified forms with this resulting panel structure featuring the union, in different ways, of both thermoformable and non-thermoformable materials having the relative density and transfacial thickness characeracteristics mentioned above herein. The union of these two materials opens the door for the creation of a relatively wide-ranging family of generally planar panel structures which may be employed successfully in a number of applications, such as the several applications mentioned earlier herein. The load-bearing characteristic of the panel structure made in accordance with the present invention, with respect to the thermal bond which exists at a transition interface region between thermoformable and non-thermoformable materials relies entirely upon bonding between these materials which is achieved during thermo-forming by a melt and flow of the resin employed in the thermoformable material. Accordingly, no additional adhesive material is employed and, as was also mentioned earlier herein, uncertainties about the load-bearing characteristics of such additional material play no role in the consideration of the design of a panel structure made in accordance with practice of the invention the invention.

By various techniques and user choices, interesting and even quite complex surface topographies can be created in the manner generally described above, and a consequence of this is that a panel structure made according to the practice of the invention may be designed to fit in a number of different applications where surface topographical features are desired for various reasons.

Accordingly, while preferred and modified embodiments of the invention have been illustrated and described herein, it is appreciated that variations and modifications may be made without departing from the spirit of the invention, and it is intended that all such variations and modifications will come within the scope of the claims to invention presented herein.

We claim:

1. A layered, generally planar panel structure comprising
  a first layer of non-thermoformable material formed of one of balsa wood, urethane foam, PVC foam, polyester foam, honeycomb plastics, honeycomb metals, and corrugated wood, having a thickness T and a density d, and possessing opposite faces,
  a second layer of thermoformable plastic material having another thickness t which is less than said thickness T, and another density D which is greater than said density d, and also possessing opposite faces, and
  a thermal-compression, inter-material-transition bond structurally featuring a prior-molten flow of plastic material received from said thermoformable plastic material joining one face in the first layer with one face in the second layer.

2. The panel structure of claim 1, wherein said thermoformable material takes the form of a polypropylene-resin-encapsulated strand material including strands made of one of glass, E-glass, S-glass and carbon fibre.

* * * * *